United States Patent
Yuan et al.

(10) Patent No.: US 11,803,341 B2
(45) Date of Patent: *Oct. 31, 2023

(54) PRINT CONTENT AUDITING DURING PRINTER REDIRECTION IN VIRTUAL DESKTOP ENVIRONMENTS

(71) Applicant: VMware, Inc., Palo Alto, CA (US)

(72) Inventors: Hui Yuan, Beijing (CN); Weigang Huang, Beijing (CN); Hui Zhang, Beijing (CN); Mangui She, Beijing (CN); Kun Shi, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/960,540

(22) Filed: Oct. 5, 2022

(65) Prior Publication Data

US 2023/0028247 A1 Jan. 26, 2023

Related U.S. Application Data

(63) Continuation of application No. 17/378,038, filed on Jul. 16, 2021, now Pat. No. 11,494,139.

(51) Int. Cl.
G06F 3/12 (2006.01)
H04N 1/32 (2006.01)
G06F 9/451 (2018.01)

(52) U.S. Cl.
CPC .......... *G06F 3/1238* (2013.01); *G06F 3/1205* (2013.01); *G06F 3/1222* (2013.01); *G06F 3/1261* (2013.01); *G06F 9/452* (2018.02); *H04N 1/3232* (2013.01); *G06F 3/1284* (2013.01); *G06F 3/1288* (2013.01)

(58) Field of Classification Search
None
See application file for complete search history.

(56) References Cited

U.S. PATENT DOCUMENTS 11,494,139 B1 * 11/2022 Yuan ..................... G06F 3/1285
2015/0154420 A1 * 6/2015 Wu ...................... G06F 21/6245
726/27

* cited by examiner

*Primary Examiner* — Lennin R Rodriguezgonzalez

(57) ABSTRACT

Techniques are described for auditing print content during printer redirection in a virtual desktop. The ability to audit redirected print content allows an organization to pre-define certain sensitive data and to track whether print redirection requests in the virtual desktop environment contain any such sensitive data. If such sensitive data is contained in a printer redirection request, a file is generated containing information about the sensitive data, as well as a watermark that encodes information about the printer redirection request, such the user identifier of the user who initiated the print request and a timestamp of when the print request occurred. The generated file is transmitted to one or more registered recipients.

20 Claims, 6 Drawing Sheets

PRINT CONTENT AUDITING DURING PRINTER REDIRECTION IN VIRTUAL DESKTOP ENVIRONMENTS

CLAIM OF PRIORITY

This application is continuation of and claims priority to U.S. patent application Ser. No. 17/378,038 entitled "PRINT CONTENT AUDITING DURING PRINTER REDIRECTION IN VIRTUAL DESKTOP ENVIRONMENTS" filed on Jul. 16, 2021 and issued as U.S. Pat. No. 11,494,139, which claims priority to International Patent Application No. PCT/CN2021/098332, filed on Jun. 4, 2021, each of which is incorporated by reference herein in its entirety.

TECHNICAL FIELD

The present disclosure generally relates to virtual desktop environments and more specifically to techniques for auditing print content during printer redirection in virtual desktops.

BACKGROUND

Desktop virtualization technologies, such as those provided as part of a virtual desktop infrastructure (VDI) or desktop-as-a-service (DAAS) offerings, are becoming more commonplace in today's enterprise work environments. The security of having a remotely stored desktop, ability to access the desktop and applications from any location and on any device, centralized desktop management, efficient use of hardware resources, as well as numerous other benefits made possible by VDI/DAAS are a large benefit for many organizations.

There exists a number of implementations of desktop virtualization, some of which offer a full desktop while others provide individual remotely accessible applications. Regardless of the implementation, a common characteristic of these technologies is that application execution takes place on a remote host server usually located in a data center, while the user uses a local client device to access the application over a network connection. For example, in a conventional VDI deployment, each user in an enterprise is provisioned a virtual desktop and is allowed to access their virtual desktop over a remote network connection, such as a WAN connection. The virtual desktops are typically hosted on servers that physically reside in a data center of the enterprise or a third-party service provider and each host server may execute multiple virtual desktops. Users can utilize a client device to remotely log into their individual virtual desktop and the client device communicates with the desktop over the network using a remoting protocol, such as remote desktop protocol (RDP), PC-over-IP protocol (PCoIP), VMware Blast, virtual network computing (VNC) protocol, or the like. Using the remoting protocol, the user can interact with applications of the virtual desktop which are running on the remote host server in such a way that only the display, keyboard, and mouse information is communicated with the local client device. A common implementation of this approach is to host multiple desktop operating system instances on separate virtual machines deployed on a server hardware platform running a hypervisor.

From an enterprise perspective, one of the advantages of deploying virtual desktop infrastructure (VDI) or other desktop virtualization solution is the ability to have centralized management and control over the software and data. Security can often be substantially improved with virtualized desktop deployments because sensitive corporate data remains under the control of the enterprise (e.g. on-premises in a data center) and employees and other individuals mostly view the data over the remote connection. While this does not fully preclude malicious users from gaining access to the corporate data, it does place a significant limitation on easily transferring large amounts of corporate data outside of the enterprise, which is desirable for many organizations that manage sensitive information, such as banks and financial institutions.

Certain conventional desktop functionality, such as printing, however, offers users the ability to extract sensitive corporate data outside of the control of the enterprise. For example, some virtual desktop solutions offer printer redirection capability, which allows users to print content from their virtual desktop using a local printer connected to their client device. This presents a security vulnerability that may be significant in certain situations. One option of addressing this type of vulnerability is for the administrator to disable printer redirection in the virtual desktop entirely. However, doing so is typically impractical because users often need the ability to print documents in order perform their daily work. In light of this, improved technologies for addressing security concerns in this context are desirable.

DETAILED DESCRIPTION

Figure 1:
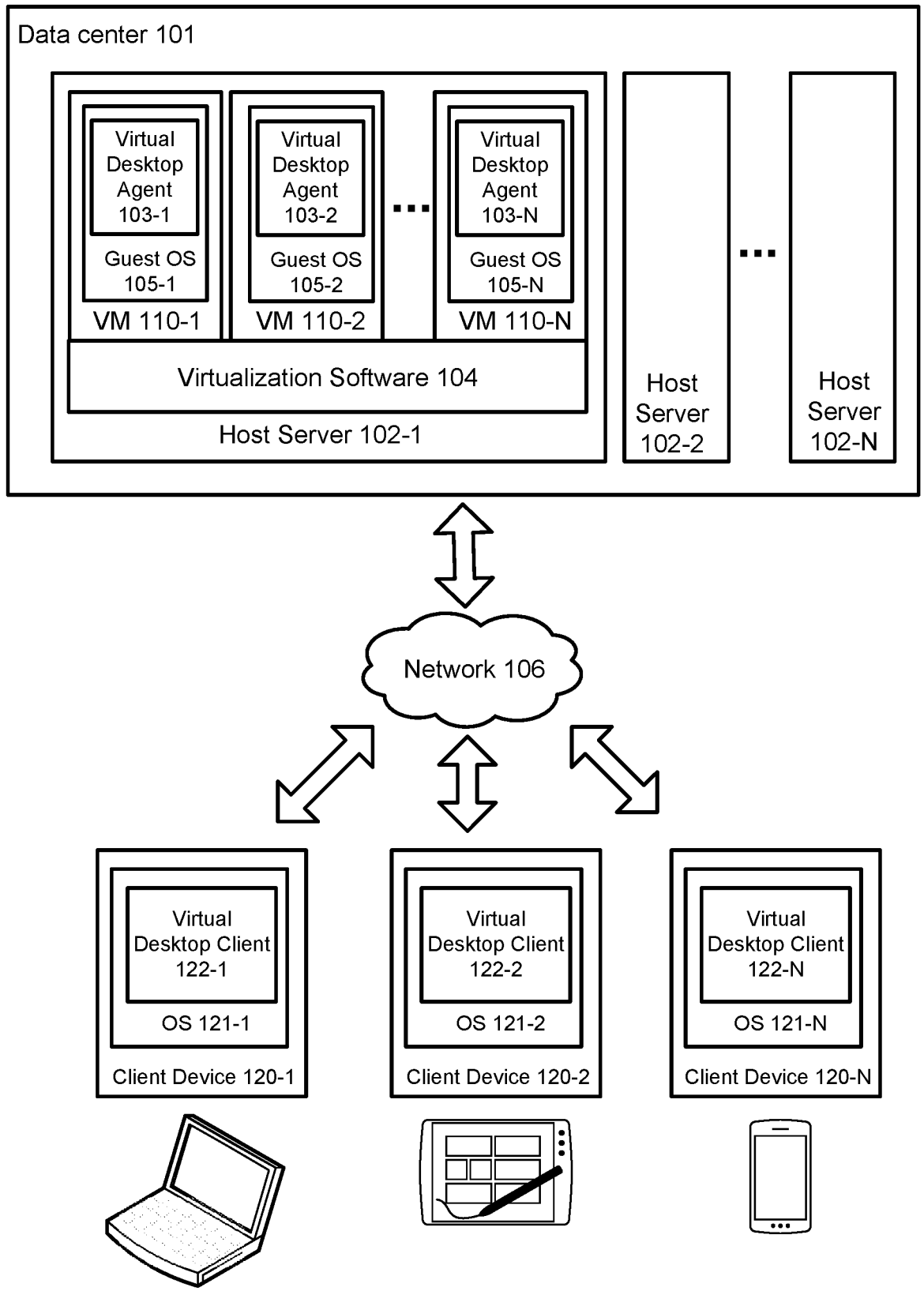
FIG. 1 illustrates an example of a virtual desktop environment, in accordance with various embodiments.

Systems and methods in accordance with various embodiments described herein overcome at least some of the deficiencies described above by auditing print content transmitted out of the virtual desktop during printer redirection. The ability to audit redirected print content in this manner allows an organization to pre-define certain sensitive data and to track whether print redirection requests in the virtual desktop environment contain any such sensitive data. If such sensitive data is contained in a printer redirection request, a report file can be generated (e.g. PNG, PDF, etc.) containing information about the sensitive data, as well as a watermark that encodes information about the printer redirection request, such the user identifier (ID) of the user who initiated the print request, a timestamp of when the print request occurred, and the like. The generated file can then be transmitted to certain registered recipients, such as an administrator, manager, or security department within the organization implementing the virtual desktop solution.

In various embodiments, the process begins when a virtual desktop session is established between a virtual desktop client operating on a client computing device and a virtual desktop agent operating on a host server. The virtual desktop client is responsible for displaying the desktop user interface (UI) information (i.e. framebuffer pixel data) received from the virtual desktop agent, as well as for capturing local user inputs such as keyboard and mouse events and transmitting them to the virtual desktop agent. Conversely, the virtual desktop agent is responsible for providing the user input to the guest operating system of the virtual desktop on the host server and is also responsible transmitting the UI information stored in the framebuffer of the host server over the network to the virtual desktop client. At the time of establishing the virtual desktop session, the virtual desktop client sends information regarding the local printers installed on the client computing device, as well as any font data, and other information of the client device OS to the virtual desktop agent.

During the virtual desktop session, a print request may be detected by the virtual desktop agent. For example, an application executing on the virtual desktop may issue a print request (based on received user input) to print a document that is opened for editing in the application. In response to the print request, a content auditor operating within the virtual desktop agent on the host server analyzes the content to be printed and determines whether the print content contains any sensitive data. In order to do this, the content auditor needs to first extract auditable content from the content that is requested to be printed. However, print requests may print data in many kinds of formats and may contain even some private self-defined format data, so retrieving the original documentation that was requested to be printed is typically not a good option for obtaining the auditable content. In various embodiments, print documentation is typically converted to Enhanced MetaFile (EMF) data by a spooler service, such as the Windows print spooler service. The EMF data can be obtained by reading the spool file (SPL) that is generated by the operating system of the virtual desktop when the user submits the print request. The spool file contains the digital document contents that are sent to the printer for printing.

In one embodiment, the content auditor accesses the EMF data generated by the print spooler service on the host server from a document requested to be printed and extracts a set of auditable content from the EMF data. Extracting the auditable content can be performed by iterating through each record in the EMF data, retrieving all glyph indices in the record, obtaining font information about the glyph indices and converting the glyph indices into corresponding text characters based on the font information. Once the auditable content has been extracted, the content auditor can determine whether the extracted auditable content matches a set of predefined sensitive data that has been specified by the organization.

If the print content contains any such sensitive data, the content auditor can generate a file containing information about the sensitive data and a watermark that encodes the user ID, timestamp etc. The file and watermark can be transmitted to one or more predetermined recipients and the print redirection request can be allowed to continue, by sending the EMF data from the virtual desktop agent to the virtual desktop client operating on the user's client device. Once the virtual desktop client receives the EMF data, it can restore the EMF data by decompressing and deduplicating the received data and provide the data to the local printer attached to the client device. In some embodiments, if the audited content in the print request contains predefined sensitive data, the print redirection request can alternatively be blocked to prevent the content from being printed. In one embodiment, the decision of whether to block the print redirection request or allow it to continue can be based on a group policy object that is set by an administrator of the organization implementing the virtual desktop solution.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the virtual desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local client device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each VM hosting a desktop for each individual user. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In one embodiment, the interaction is performed by the virtual desktop agent transmitting encoded visual display information (e.g., framebuffer pixel data) over the network to the virtual desktop client and the virtual desktop client in turn transmitting user input events (e.g. keyboard, mouse, touch input events) to the remote desktop agent. Interactions between the virtual desktop client (e.g., 122-1, 122-2, 122-N) and the virtual desktop agent (e.g. 103-1, 103-2, 103-N), including transmission of encoded visual display information from the agent to the client and user input events from the client to the agent can be performed using a remote desktop protocol, such as Remote Desktop Protocol (RDP), PC-over-IP protocol (PCoIP), VMware Blast protocol, virtual network computing (VNC) protocol, or the like.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment might include many more host servers, which may be distributed over multiple data centers, which can include many other types of devices, such as switches, power supplies, cooling systems, environmental controls, and the like, which are not illustrated herein. Similarly, a single host server would typically host many more virtual machines than the number shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
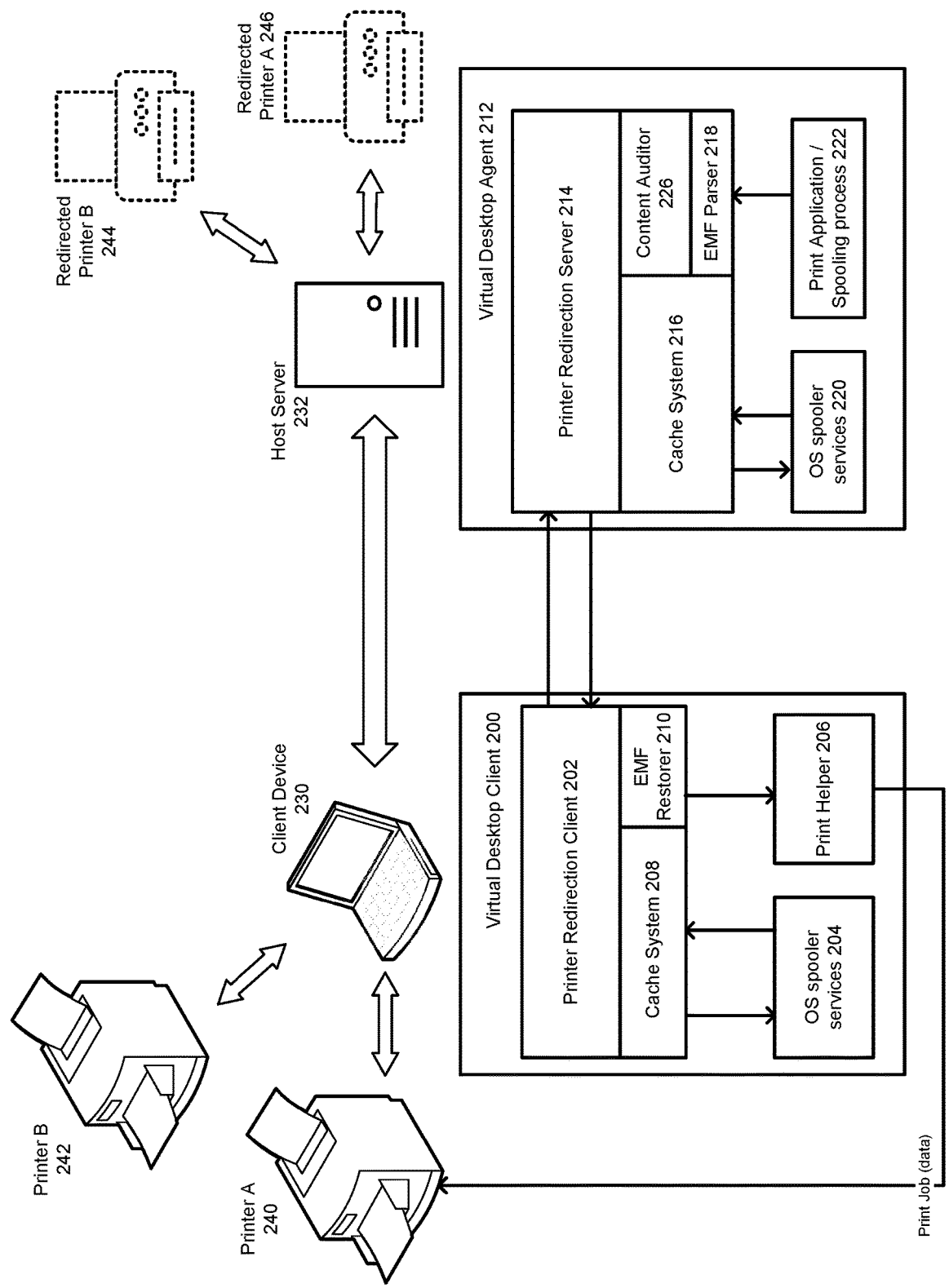
FIG. 2 is an illustration of a system for auditing print content during printer redirection in a virtual desktop, in accordance with various embodiments.

FIG. 2 is an illustration of a system for auditing print content during print redirection in a virtual desktop, in accordance with various embodiments. As shown in the illustration, the virtual desktop client 200 includes a printer redirection client 202 and the virtual desktop agent 212 includes the printer redirection server 214. At the time of establishing the virtual desktop session, the printer redirection client 202 transmits to the printer redirection server 214 a set of information, including information about any local physical printers (printer A 240 and printer B 242) installed on the client computing device 230. The local connected/installed printer information can be obtained by the printer redirection client 202 by using API provided by OS spooler services 204. In addition, the printer redirection client 202 sends information about the fonts available on the operating system of the client computing device 230 to the printer redirection server 214. In one embodiment, the printer redirection client 202 obtains the available font information by making one or more Application Programming Interface (API) calls to the operating system on the client computing device.

In response to receiving the information from the client, the printer redirection server 214 installs redirected printer A 246 and redirected printer B 244 on the virtual desktop corresponding to the physical printer A 240 and physical printer B 242. This can be done by communicating with the OS spooler services 220 on the host server.

During the virtual desktop session, the user may issue a print request when using an application 222 being executed on the virtual desktop. For example, the user may provide input to (over the network) to print a document when accessing a version of Microsoft Word executing on the desktop running on the virtual machine hosted on the host server 232. In response to the user's input, the print application 222 initiates a spooling process which provides the spool data (e.g. SPL/EMF data containing the digital contents of the document) to the EMF parser 218 of the printer redirection server 214. Enhanced MetaFile (EMF) is a commonly used spool file format used in printing by the Windows operating system. An EMF metafile is a series of variable-length records. Referred to as EMF records, these are objects that represent each element in the document and contain graphics drawing commands, object definitions and properties. Different records have different attributes, the values of which are defined by the data within the EMF file. Communication between the print application 222 and the EMF parser 218 can be implemented over Remote Procedure Call (RPC).

The EMF parser 218 extracts a set of auditable content from the EMF data generated by the print spooler service and performs deduplication and compression of the EMF data for transmission to the printer redirection client 202. The process for extracting the text to be printed from the EMF data is described in further detail below with reference to FIG. 4A. In one embodiment, the EMF parser 218 iterates through each record of the EMF data and retrieves all of the glyph indices in each record. A glyph is a graphical symbol intended to represent a text character in a particular font and the glyph index is the identifier of that glyph in the font. Once the glyph indices are retrieved, the EMF parser 218 obtains font information about the glyph indices and then using that font information, converts the glyph indices into corresponding text characters. The process for converting the glyph indices into corresponding text characters is described in further detail with reference to FIG. 4B below. In various embodiments, the font information can be obtained from the cache systems (208, 216) that are synchronized between the print redirection client 202 and the print redirection server 214.

Once the text characters in the content to be printed have been retrieved from the EMF data, the content auditor 226 determines whether the auditable content in the print content contains any pre-defined sensitive data. For example, the content auditor 226 may have a set of pre-defined set of keywords or other sensitive data that has been specified by the organization (e.g., stored in a configuration file) and the content auditor 226 may perform pattern matching to determine whether the auditable content contains any such keywords or sensitive data.

If the auditable content contains the pre-defined sensitive data, the content auditor 226 generates a report file, such as a file in the PNG (Portable Network Graphics) or PDF (Portable Document Format) format, which contains information about the sensitive data in the content that is requested to be printed and a watermark containing information about the print redirection request. For example, the watermark may encode a timestamp indicating the time at which the print request was initiated and a user ID of the user that initiated the print request. The content auditor 226 then transmits the report file along with a notification to one or more registered recipients, such as an administrator, security department or the like.

In some embodiments, the print redirection request is then allowed to proceed by sending the EMF data to the printer redirection client 202. The EMF restorer 210 at the printer redirection client 202 receives all of the EMF data, restores the deduplicated data and performs the decompression process on the received data. The print request is then redirected to the print helper 206 which routes the print request including all of the necessary information to print the document to printer A 240. In alternative embodiments, the print redirection request may be blocked by the content auditor 226 if the extracted auditable content contains the predefined sensitive data. The decision on whether to allow the print redirection request to proceed or block the print redirection request can be made configurable by an administrator, such as by setting a value in a group policy object, or configuration file.

Figure 3:
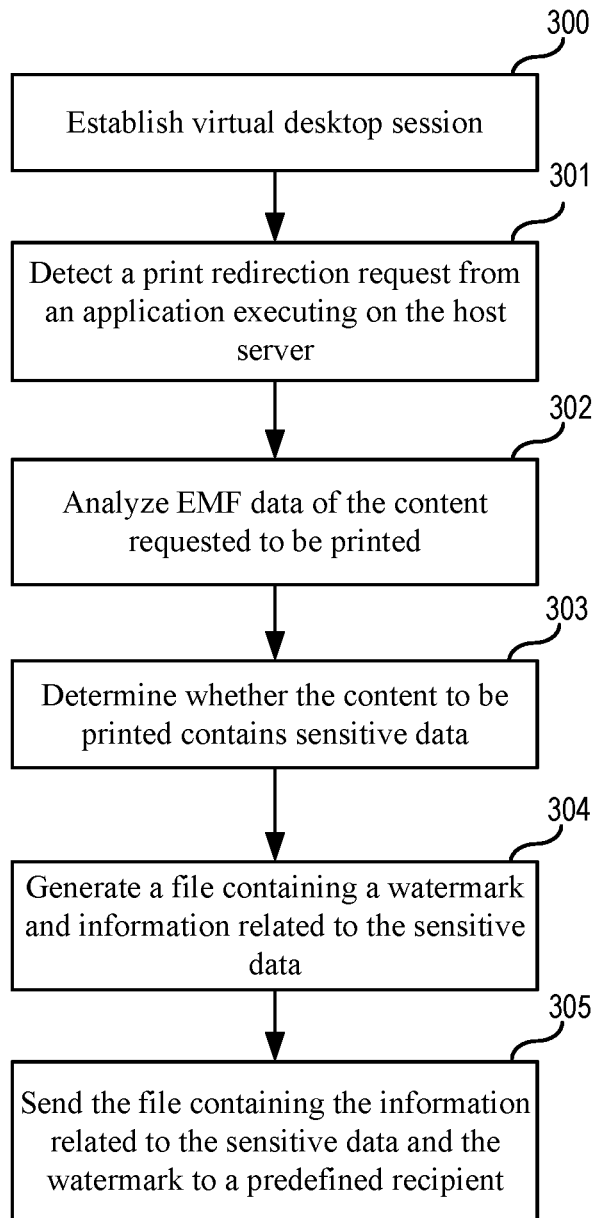
FIG. 3 illustrates an example of a process for auditing print content during printer redirection in virtual desktop environments, in accordance with various embodiments.

FIG. 3 illustrates an example of a process for auditing print content during printer redirection in virtual desktop environments, in accordance with various embodiments. As shown in operation 300, a virtual desktop session is first established between a virtual desktop client and a virtual desktop agent. In operation 301, a print redirection request is received from an application executing on the host server. The print redirection request can be initiated by the user accessing the application over the remote desktop connection. The print redirection request is a request to print the content being displayed on the virtual desktop by redirecting the print content from the virtual desktop to the local physical printer connected to the client computing device.

In operation 302, the content auditor analyzes the EMF data of the content to be printed to extract the auditable content from the EMF data. In one embodiment, this is performed by iterating through each record of the EMF data and retrieving all of the glyph indices in each record. Once the glyph indices are obtained, font information about the glyph indices is retrieved and the glyph indices are converted into corresponding text characters by using the font information.

In operation 303, the content auditor determines whether auditable content extracted from the EMF data contains any predefined sensitive data. If the auditable content does contain sensitive data, in operation 304, the content auditor generates a report file containing information related to the sensitive data contained in the print content and a watermark encoded with information about the print request. In operation 305, the report file including the watermark is sent to one or more registered recipients.

Figure 4A:
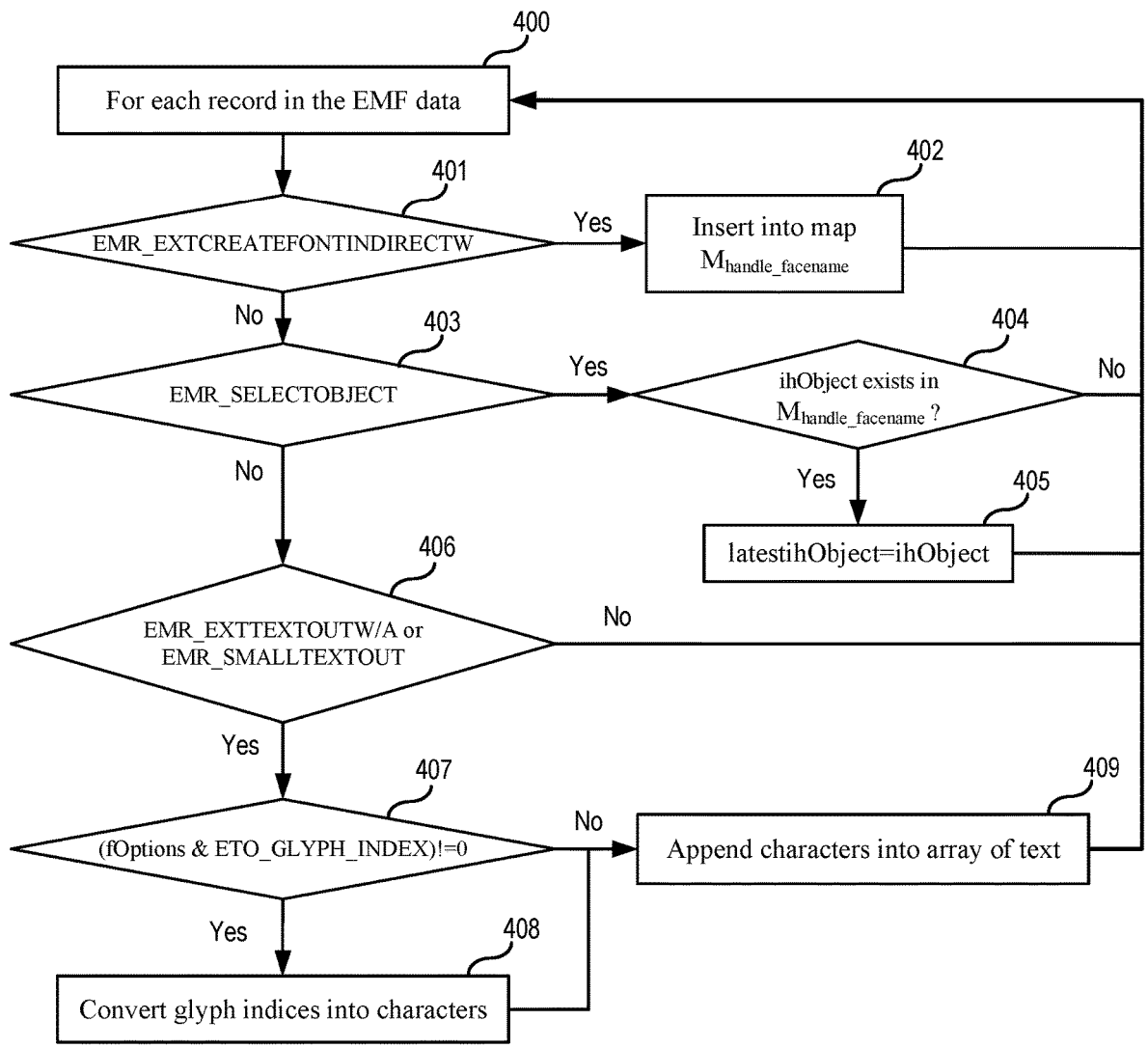
FIG. 4A is an example process for extracting auditable content from the EMF data, in accordance with various embodiments.

FIG. 4A is an example of extracting auditable content from the EMF data, in accordance with various embodiments. The input to the process illustrated in FIG. 4A is the EMF content of the document to be printed and the output of the process is the array of text which is about to be printed.

Figure 4B:
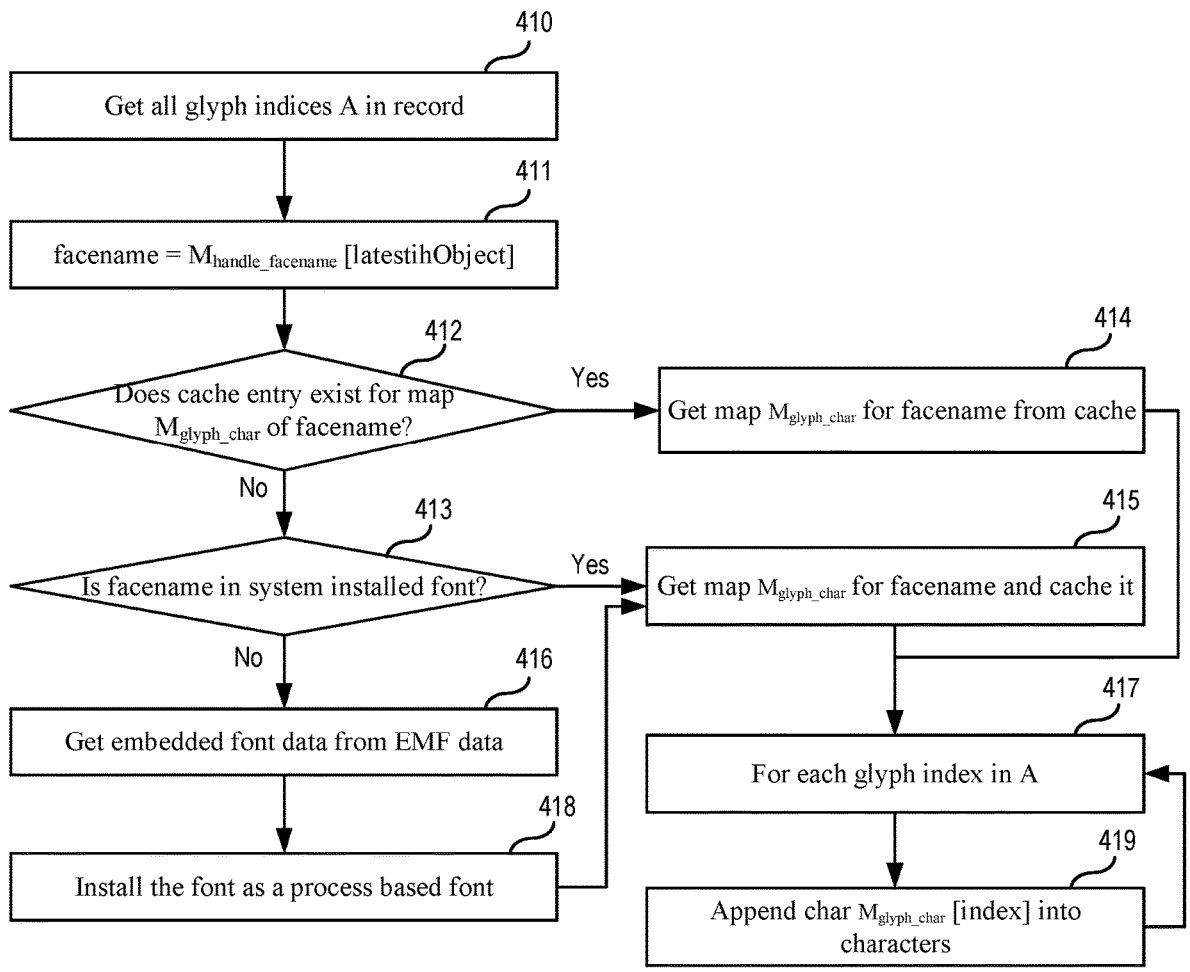
FIG. 4B illustrates an example process for converting glyph indices into corresponding characters, in accordance with various embodiments.

As previously described, EMF files are intended to be portable between applications, with the EMF structure specifying a metafile format that can store a picture in device-independent form. The stored picture can be rendered by parsing and processing the metafile. An EMF metafile is a series of variable-length records. Called EMF records, these are objects that represent each element in the document and contain graphics drawing commands, object definitions and properties. Different records have different attributes, the values of which are defined by the data within the EMF file. It should be noted that although FIGS. 4A and 4B are illustrated using EMF as the example format, the various embodiments described throughout this disclosure are not necessarily limited to EMF and may encompass various other formats, such as XML Paper Specification (XPS), Postscript, or others.

As shown in operation 400, each record in the EMF data is iteratively processed by the print redirection server. In operation 401, it is checked whether the current EMF record is EMR_EXTCREATEFONTINDIRECTW. The EMR_EXTCREATEFONTINDIRECTW record defines a logical font for graphics operations and this logical font object can be selected into the device context by an EMR_SELECTOBJECT record, which specifies the logical font to use in subsequent graphics operations. If operation 401 determines that the current EMF record is EMR_EXTCREATEFONTINDIRECTW, then operation 402 is executed, where the logical font is inserted into the map $M_{handle\_facename}$ which is a key-value map with the key being the value identifier and the name being the Facename of the font. Processing then proceeds back to operation 400 where the next EMF record is processed iteratively. If operation 401 determines that the record is not EMR_EXTCREATEFONTINDIRECTW, then processing proceeds to operation 403 where EMR_SELECTOBJECT record is checked.

In operation 403, it is checked whether the current EMF record is EMR_SELECTOBJECT. EMR_SELECTOBJECT record selects the graphics object into the device context, where the variable ihObject is the index of a graphics object (font object) in EMF object table. If the record is not EMR_SELECTOBJECT, processing proceeds to operation 406. If the record is EMR_SELECTOBJECT, then processing proceeds to operation 404, where it is checked whether the ihObject of the graphics object exists in the key-value map $M_{handle\_facename}$. If the ihObject does not exist in the map $M_{handle\_facename}$, processing proceeds back to operation 400 where the next EMF record is processed. If the ihObject does exist in the map $M_{handle\_facename}$, then the variable latestihObject is set to the ihObject in operation 405. In this manner, the variable latestihObject always records the handle identifier of latest selected font. After operation 405, processing proceeds back to operation 400 to process the next EMF record.

In operation 406, it is checked whether the current EMF record is EMR_EXTTEXTOUTW, EMR_EXTTEXTOUTA, or EMR_SMALLTEXTOUT.

EMR_EXTTEXTOUTW/A are two types of records (EMR_EXTTEXTOUTW and EMR_EXTTEXTOUTA) which draw a text string using the current font (the latest font selected into the device context). EMR_SMALLTEXTOUT outputs a string using the current font. If the current EMF record is none of EMR_EXTTEXTOUTW, EMR_EXTTEXTOUTA, or EMR_SMALLTEXTOUT, then processing proceeds back to operation 400, where the next EMF record is processed iteratively. If the current EMF record is one of EMR_EXTTEXTOUTW, EMR_EXTTEXTOUTA, or EMR_SMALLTEXTOUT, then processing proceeds to operation 407, where it is checked whether there is a flag set for ETO_GLYPH_INDEX in fOptions, indicating that the data in the record is stored as characters instead of glyph indices. The attribute fOptions contains a combination of parameters that control various aspects of the output of text by the records EMR_EXTTEXTOUTW, EMR_EXTTEXTOUTA, and EMR_SMALLTEXTOUT. Operation 407 determines whether there is a flag set for ETO_GLYPH_INDEX in fOptions. ETO_GLYPH_INDEX is a bit that indicates that the codes for characters in an output text string are indexes of the character glyphs in a TrueType font. Glyph indices are font-specific, so to display the correct characters on playback, the font that is used must be identical to the font used to generate the indices. Therefore, if the evaluation (fOptions AND ETO_GLYP_INDEX) is equal to 0, then there is no flag set for ETO_GLYPH_INDEX in fOption, which means that the data in EMR_EXTTEXTOUTW, EMR_EXTTEXTOUTA, or EMR_SMALLTEXTOUT are characters and therefore there is no need to convert from glyph index to character. On the other hand if the evaluation is not equal to 0, then the flag has been set and this means that the data is stored as glyph indices. If operation 407, indicates that the data is stored as glyph indices, processing proceeds to operation 408, where the glyph indices are converted into characters. The process for converting glyph indices into corresponding characters is described in further detail below, with reference to FIG. 4B. Once the glyph indices have been converted into characters, processing proceeds to operation 409, where the characters are appended to the output array of text. Similarly, if the result of operation 407 indicates that the string is already stored as characters (as opposed to glyph indices), the characters are appended to the array. As mentioned above, once the process illustrated in FIG. 4A is complete, an output array of characters is produced which is about to printed. This output array of characters can be audited by the content auditor to determine whether the output array contain any predefined sensitive keywords or other sensitive data, as described throughout this disclosure.

FIG. 4B illustrates an example process for converting glyph indices into corresponding characters, in accordance with various embodiments. In operation 410, the glyph indices A of the current EMF record are retrieved. In operation 411, the facename is set to the latest selected font by indexing into the map $M_{handle\_facename}$ by the handle identifier latestihObject as previously described. In operation 412, it is checked whether a cache entry exists in the cache 216 for the map $M_{glyph\_char}$ containing character values of the glyph indices of the current selected font. If the cache entry exists, operation 414 retrieves the map $M_{glyph\_char}$ containing the character values from the cache. If no cache entry exists, operation 412 determines whether the font with the facename is part of the system installed fonts. If the font is part of the system installed fonts, operation 415 retrieves the map $M_{glyph\_char}$ containing the character values from the system installed fonts and also stores the map $M_{glyph\_char}$ into the cache. Once the map $M_{glyph\_char}$ has been retrieved from the cache or from the system installed fonts, operation 417 iterates through each glyph index in the glyph indices A of the current EMF record and operation 419 appends the character value char $M_{glyph\_char}$ [index] into characters of the glyph index.

If the font having facename is not part of the system installed font, operation 416 gets embedded font data from the EMF data. Some applications may embed some self-defined fonts into the content to be printed, in which case, that self-defined font would not be found in either the cache or in the system installed font information. In those cases, operation 416 is configured to retrieve that embedded self-defined font information from the EMF data. Once the self-defined font is retrieved from the EMF data, operation 418 installs the retrieved font as a process-based font and the process continues to operation 415, as described above.

Figure 5:
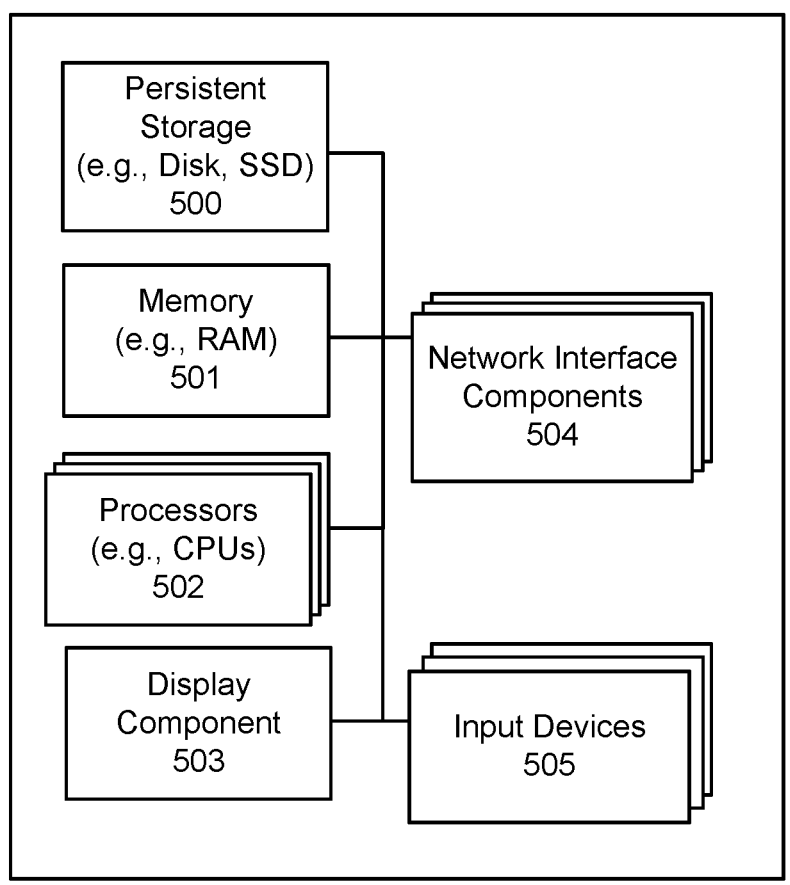
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random-access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for auditing print content, the method comprising:
   detecting a print redirection request from an application executing on a host server, the print redirection request configured to print content on a local printer connected to a client computing device accessing the application over a network;
   determining whether the content requested to be printed contains sensitive data; and
   in response to determining that the content requested to be printed contains sensitive data, generating a report file containing information related to the sensitive data contained in the content requested to be printed.

2. The method of claim 1, wherein determining whether the content requested to be printed contains sensitive data further comprises:
   accessing Enhanced MetaFile (EMF) data generated by a print spooler service on the host server, wherein the print spooler service generates the EMF data from a document requested to be printed;
   extracting a set of auditable content from the EMF data; and
   determining whether the set of extracted auditable content matches a set of predefined sensitive data.

3. The method of claim 2, wherein extracting the set of auditable content from the EMF data further comprises:
   iterating through each record in the EMF data;
   retrieving all glyph indices in said each record;
   obtaining font information about the glyph indices; and
   converting the glyph indices into corresponding text characters based on the font information.

4. The method of claim 2, wherein the EMF data is retrieved from the system print service on the host server by a virtual desktop agent, wherein the virtual desktop agent is configured to transmit the EMF data over the network connection to a virtual desktop client operating on the client computing device for printing the EMF data on the local printer communicatively coupled to the client computing device.

5. The method of claim 1, further comprising:
   embedding a watermark into the report file, wherein the watermark identifies a user that initiated the print request and a timestamp at which the print request was initiated.

6. The method of claim 1, further comprising:
   transmitting the report file containing the information related to the sensitive data to at least one registered recipient.

7. The method of claim 1, further comprising:
   in response to determining that the content requested to be printed does not contain the sensitive data, transmitting the content to the client computing device; and
   causing the content to be printed on the local printer connected to the client computing device.

8. A computing system, comprising:
   at least one processor; and
   memory including instructions that, when executed by the at least one processor, cause the computing system to perform the operations of:
      detecting a print redirection request from an application executing on a host server, the print redirection request configured to print content on a local printer connected to a client computing device accessing the application over a network;
      determining whether the content requested to be printed contains sensitive data; and
      in response to determining that the content requested to be printed contains sensitive data, generating a report file containing information related to the sensitive data contained in the content requested to be printed.

9. The computing system of claim 8, wherein determining whether the content requested to be printed contains sensitive data further comprises:
   accessing Enhanced MetaFile (EMF) data generated by a print spooler service on the host server, wherein the print spooler service generates the EMF data from a document requested to be printed;
   extracting a set of auditable content from the EMF data; and
   determining whether the set of extracted auditable content matches a set of predefined sensitive data.

10. The computing system of claim 9, wherein extracting the set of auditable content from the EMF data further comprises:
    iterating through each record in the EMF data;
    retrieving all glyph indices in said each record;
    obtaining font information about the glyph indices; and converting the glyph indices into corresponding text characters based on the font information.

11. The computing system of claim 9, wherein the EMF data is retrieved from the system print service on the host server by a virtual desktop agent, wherein the virtual desktop agent is configured to transmit the EMF data over the network connection to a virtual desktop client operating on the client computing device for printing the EMF data on the local printer communicatively coupled to the client computing device.

12. The computing system of claim 8, wherein the memory further comprises instructions for:
 embedding a watermark into the report file, wherein the watermark identifies a user that initiated the print request and a timestamp at which the print request was initiated.

13. The computing system of claim 8, wherein the memory further comprises instructions for:
 transmitting the report file containing the information related to the sensitive data to at least one registered recipient.

14. The computing system of claim 8, wherein the memory further comprises instructions for:
 in response to determining that the content requested to be printed does not contain the sensitive data, transmitting the content client computing device; and
 causing the content to be printed on the local printer connected to the client computing device.

15. A non-transitory computer readable storage medium comprising one or more sequences of instructions, the instructions when executed by one or more processors causing the one or more processors to execute the operations of:
 detecting a print redirection request from an application executing on a host server, the print redirection request configured to print content on a local printer connected to a client computing device accessing the application over a network;
 determining whether the content requested to be printed contains sensitive data; and
 in response to determining that the content requested to be printed contains sensitive data, generating a report file containing information related to the sensitive data contained in the content requested to be printed.

16. The non-transitory computer readable storage medium of claim 15, wherein determining whether the content requested to be printed contains sensitive data further comprises:
 accessing Enhanced MetaFile (EMF) data generated by a print spooler service on the host server, wherein the print spooler service generates the EMF data from a document requested to be printed;
 extracting a set of auditable content from the EMF data; and
 determining whether the set of extracted auditable content matches a set of predefined sensitive data.

17. The non-transitory computer readable storage medium of claim 16, wherein extracting the set of auditable content from the EMF data further comprises:
 iterating through each record in the EMF data;
 retrieving all glyph indices in said each record;
 obtaining font information about the glyph indices; and
 converting the glyph indices into corresponding text characters based on the font information.

18. The non-transitory computer readable storage medium of claim 16, wherein the EMF data is retrieved from the system print service on the host server by a virtual desktop agent, wherein the virtual desktop agent is configured to transmit the EMF data over the network connection to a virtual desktop client operating on the client computing device for printing the EMF data on the local printer communicatively coupled to the client computing device.

19. The non-transitory computer readable storage medium of claim 15, further comprising instructions for:
 embedding a watermark into the report file, wherein the watermark identifies a user that initiated the print request and a timestamp at which the print request was initiated.

20. The non-transitory computer readable storage medium of claim 15, further comprising instructions for:
 transmitting the report file containing the information related to the sensitive data to at least one registered recipient.

* * * * *